United States Patent
Franceschini et al.

(10) Patent No.: US 9,483,580 B2
(45) Date of Patent: Nov. 1, 2016

(54) ESTIMATION OF CLOSENESS OF TOPICS BASED ON GRAPH ANALYTICS

(71) Applicant: International Business Machines Corporation, Armonk, NY (US)

(72) Inventors: Michele M. Franceschini, White Plains, NY (US); Ashish Jagmohan, Irvington, NY (US); Luis A. Lastras-Montano, Cortlandt Manor, NY (US); Livio Soares, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 13/915,524

(22) Filed: Jun. 11, 2013

(65) Prior Publication Data

US 2014/0365503 A1 Dec. 11, 2014

(51) Int. Cl.
*G06F 17/30* (2006.01)
*G06N 5/04* (2006.01)
*G06N 7/00* (2006.01)

(52) U.S. Cl.
CPC ......... *G06F 17/30958* (2013.01); *G06N 5/046* (2013.01); *G06N 7/005* (2013.01)

(58) Field of Classification Search
CPC ................................................ G06F 17/30958
See application file for complete search history.

(56) References Cited

U.S. PATENT DOCUMENTS

| | | | |
|---|---|---|---|
| 7,987,233 B1 | 7/2011 | Osborne et al. | |
| 8,886,655 B1 | 11/2014 | Nandy | |
| 9,031,951 B1 | 5/2015 | Baluja | |
| 2009/0063991 A1 | 3/2009 | Baron et al. | |
| 2009/0164897 A1* | 6/2009 | Amer-Yahia et al. | 715/703 |
| 2011/0029475 A1* | 2/2011 | Gionis et al. | 706/52 |
| 2012/0096015 A1 | 4/2012 | Koomulil et al. | |
| 2012/0254096 A1* | 10/2012 | Flinn | G06N 7/02 706/52 |
| 2013/0080428 A1* | 3/2013 | Wang et al. | 707/732 |
| 2013/0226758 A1 | 8/2013 | Reitan | |
| 2013/0297543 A1* | 11/2013 | Treiser | 706/45 |
| 2014/0052540 A1* | 2/2014 | Rajaram | G06Q 30/0255 705/14.66 |
| 2014/0067943 A1 | 3/2014 | Jackson et al. | |
| 2014/0074893 A1 | 3/2014 | Griffin | |
| 2014/0280224 A1* | 9/2014 | Feinberg et al. | 707/748 |
| 2014/0280294 A1 | 9/2014 | Stekkelpak et al. | |
| 2014/0365503 A1 | 12/2014 | Franceschini et al. | |

OTHER PUBLICATIONS

Sepandar D. Kamvar et al., "Adaptive Methods for the Computation of PageRank," Accepted to the International Conference on the Numerical Solution of Markov Chains, Sep. 2003, 15 pages.
Taher Haveliwala et al. "An Analytical Comparison of Approaches to Personalizing PageRank," Preprint, Jun. 2003, 4 pages.
Taher Haveliwala et al. "Computing PageRank Using Power Extrapolation," Preprint, Jul. 2003, 12 pages.
(Continued)

*Primary Examiner* — Khanh Pham
(74) *Attorney, Agent, or Firm* — Cantor Colburn LLP

(57) ABSTRACT

Embodiments relate to estimating closeness of topics based on graph analytics. A graph that includes a plurality of nodes and edges is accessed. Each node in the graph represents a topic and each edge represents a known association between two topics. A statistical traversal experiment is performed on the graph. A strength of relations between any two topics represented by nodes in the graph is inferred based on statistics extracted from the statistical traversal experiment.

13 Claims, 13 Drawing Sheets

(56) References Cited

OTHER PUBLICATIONS

Taher H. Haveliwala, "Efficient Encodings for Document Ranking Vectors", Accepted to the International Conference on Internet Computing, Jun. 2003, 8 pages Sepandar D. Kamvar et al. "Exploiting the Block Structure of the Web for Computing PageRank", Preprint, Mar. 2003, 3 pages.

Sepandar D. Kamvar et al. "Extrapolation Methods for Accelerating PageRank Computations" In Proceedings of the Twelfth International World Wide Web Conference, May 2003, 3 pages.

Glen Jeh et al. "Scaling Personalized Web Search," In Proceedings of the Twelfth International World Wide Web Conference, May 2003, 35 pages.

Sepandar D. Kamvar et al., "The Condition Number of the PageRank Problem," Preprint, Jun. 2003, 4 pages.

Taher H. Haveliwala et al. "The Second Eigenvalue of the Google Matrix," Preprint, Apr. 2003, 8 pages.

Taher H. Haveliwala, "Topic-Sensitive PageRank", In Proceedings of the Eleventh International World Wide Web Conference, May 2002, 4 pages.

Taher H. Haveliwala, "Topic-Sensitive PageRank: A Context-Sensitive Ranking Algorithm for Web Search", IEEE Transactions on Knowledge and Data Engineering, 2003, 6 pages.

U.S. Appl. No. 13/915,547; Non-Final Office Action; Date Filed: Jun. 11, 2013; Date Mailed: Apr. 24, 2015; 42 pages.

U.S. Appl. No. 13/942,790; Non-Final Office Action; Date Filed: Jul. 16, 2013; Date Mailed: Jul. 10, 2015; 24 pages.

U.S. Appl. No. 13/942,868; Final Office Action; Date Filed: Jul. 16, 2013; Date Mailed: Mar. 31, 2016; 42 pages.

U.S. Appl. No. 13/915,547; Final Office Action, Date Filed: Jun. 11, 2013; Date Mailed: Nov. 12, 2015; 63 pages.

U.S. Appl. No. 13/942,790; Final Office Action, Date Filed: Jul. 16, 2013; Date Mailed: Nov. 30, 2015; 20 pages.

U.S. Appl. No. 13/942,868; Non-Final Office Action; Date Filed: Jul. 16, 2013; Date Mailed: Sep. 24, 2015; 38 pages.

\* cited by examiner

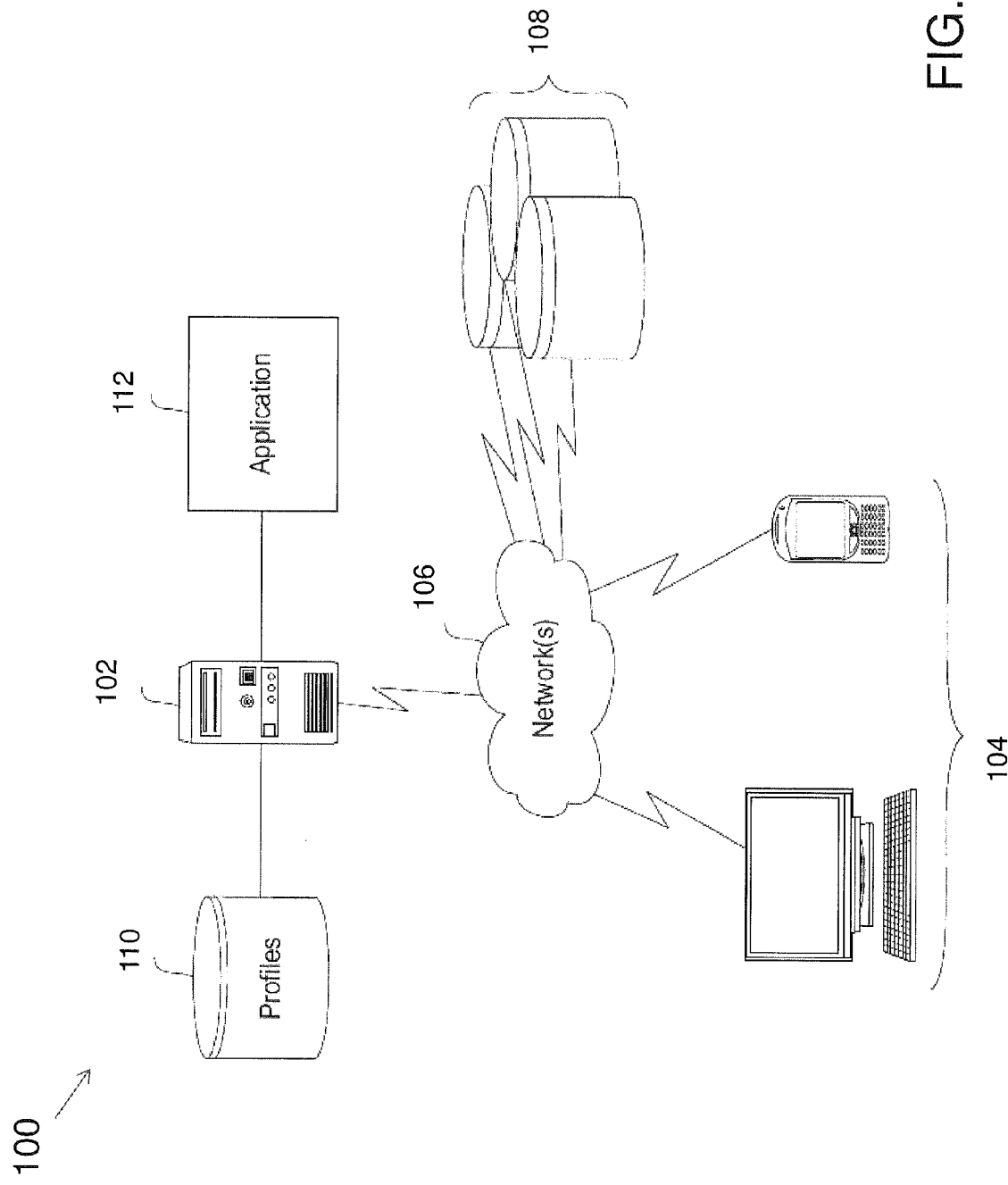

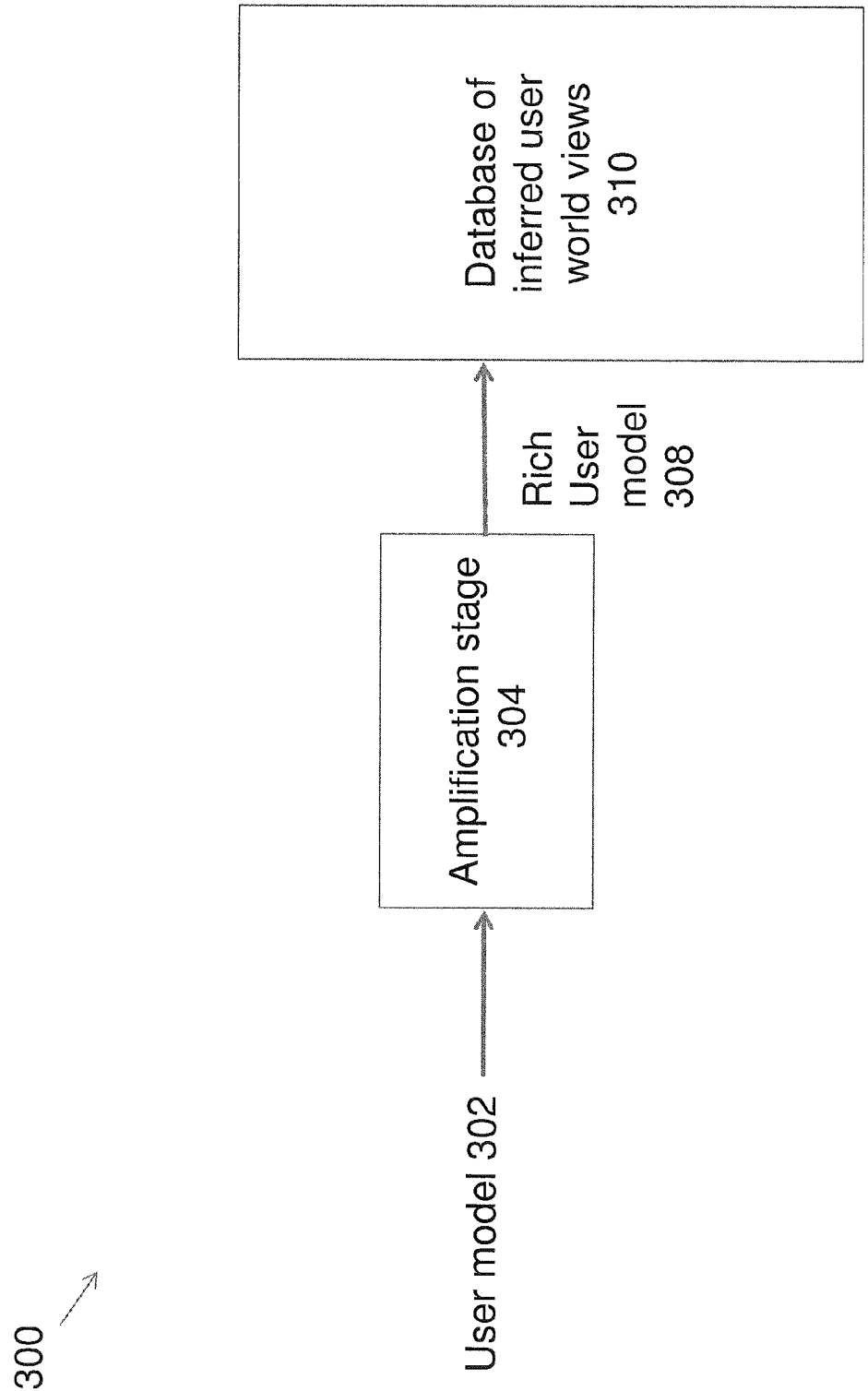

| | Parallel Processing | GPGPU | Data mining | Beethoven | Classical music | Hip hop | USA |
|---|---|---|---|---|---|---|---|
| Parallel processing | 0 | -12 | -15 | -20 | -20 | -20 | -16 |
| GPGPU | -11 | 0 | -11 | -19 | -18 | -19 | -17 |
| Data mining | -13 | -10 | 0 | -16 | -15 | -17 | -15 |
| Beethoven | -16 | -16 | -15 | 0 | -8 | -13 | -13 |
| Classical Music | -15 | -15 | -12 | -8 | 0 | -11 | -12 |
| Hip hop | -16 | -16 | -15 | -12 | -11 | 0 | -12 |
| USA | -8 | -10 | -8 | -9 | -8 | -8 | 0 |

Personal topics (columns) / Query topics (rows)

| | Parallel Processing | GPGPU | Data mining | Beethoven | Classical music | Hip hop | USA |
|---|---|---|---|---|---|---|---|
| Parallel processing | 1.0 | 0.96 | 0.54 | 0.5 | 0.5 | 0.5 | 0.5 |
| GPGPU | 0.97 | 1.0 | 0.94 | 0.5 | 0.5 | 0.5 | 0.5 |
| Data mining | 0.7 | 0.94 | 1.0 | 0.5 | 0.5 | 0.5 | 0.5 |
| Beethoven | 0.5 | 0.5 | 0.5 | 1.0 | 0.95 | 0.5 | 0.5 |
| Classical Music | 0.5 | 0.5 | 0.5 | 0.96 | 1.0 | 0.67 | 0.5 |
| Hip hop | 0.5 | 0.5 | 0.5 | 0.5 | 0.6 | 1.0 | 0.5 |
| USA | 0.5 | 0.5 | 0.5 | 0.5 | 0.5 | 0.5 | 1.0 |

Personal topics (columns) / Query topics (rows)

900

ESTIMATION OF CLOSENESS OF TOPICS BASED ON GRAPH ANALYTICS

BACKGROUND

The present disclosure relates generally to graph analytics, and more specifically, to estimating closeness of topics based on graph analytics.

Search engines have become useful tools in helping users find information of interest across the internet. Typically, when a user wishes to use a search engine, the user may input a search query into a search box. The user can then submit the search query, which can lead the user to a search results page of one or more search results corresponding to the query. The user may then be able to select one of the search results, in which the selection of the result may lead the user to a web page for browsing.

Social networks, such as Facebook® and LinkedIn®, also provide a means for users to obtain (and share) information. Online social network services bring individuals together into online communities, based on connections established between the individual users. Such connections may be based on friendships, family relationships, business relationships, and the like.

Most online social network services also allow users to organize themselves into groups. Such groups may be based on a theme common to members of the group, such as, for example, common interests, causes, or shared circumstances. In these groups messages and other data may be exchanged that is specifically applicable to or intended for the membership of that group. Some groups may allow any user to join, while other "private" groups may require that potential group members be invited by a moderator or existing member of the group. The organization of users into different groups within an online social network service may serve the purpose of focusing the exchange of information related to a specific topic or social cause to its intended recipients.

BRIEF SUMMARY

Embodiments include systems and computer program products for inferring relations between topics. An embodiment may include accessing a graph that includes a plurality of nodes and edges. Each node in the graph represents a topic and each edge represents a known association between two topics. The embodiment may also include performing a statistical traversal experiment on the graph. The embodiment may further include inferring a strength of relations between any two topics represented by nodes in the graph. The inferring may be based on statistics extracted from the statistical traversal experiment.

Embodiments also include systems and computer program products for identifying a level of interest of an agent in a topic relative to the level of interest of other agents in the topic. An embodiment may include gathering information about a set of agents. The embodiment may also include, based on the information, computing a strength of a connection between the topic and each agent in the set of agents. The embodiment may further include ranking the connection between the topic and an agent based on how distinct the agent's connection is to the topic relative to other agents in the set of agents. The embodiment may further include outputting a result of the ranking.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 1 depicts a system upon which social interaction facilitation processes may be implemented in accordance with an embodiment;

FIG. 3 illustrates an exemplary architecture for building a profile for a user in accordance with an embodiment;

FIG. 7 depicts a raw score table;

FIG. 9 depicts a refined score table in accordance with an embodiment;

DETAILED DESCRIPTION

Figure 2A:
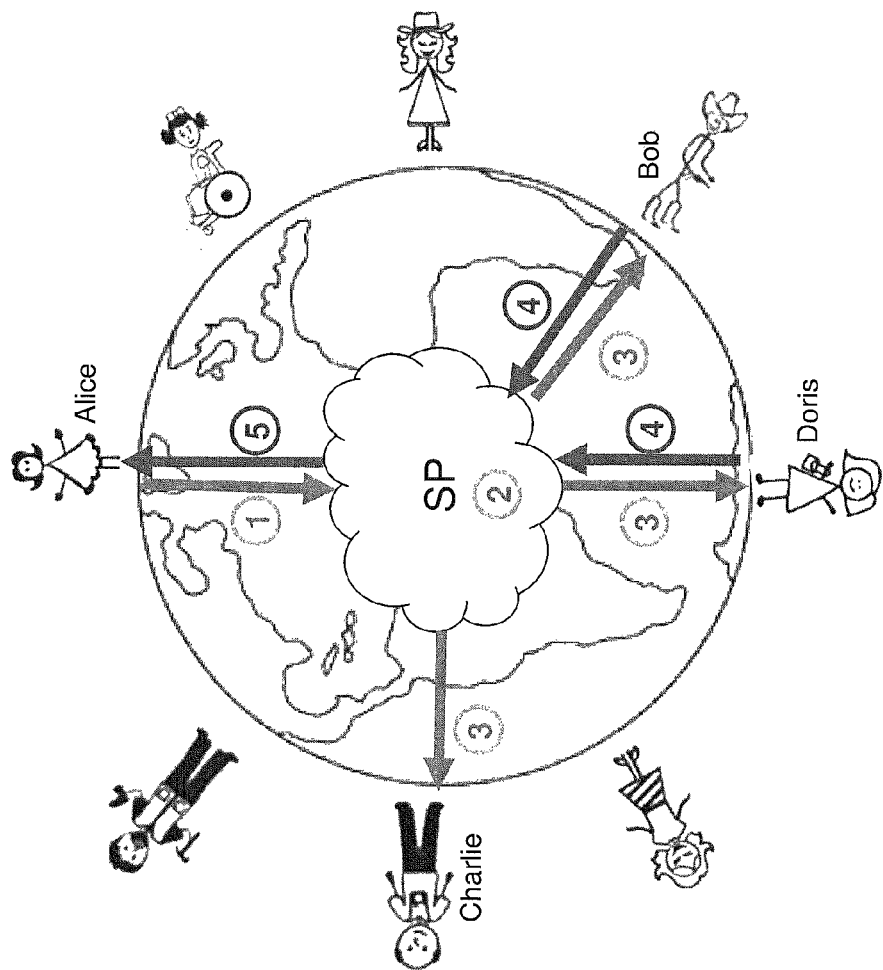
FIG. 2A illustrates a system environment for connecting users in an instant community in accordance with an embodiment.

Embodiments described herein provide a social interaction facilitation tool that facilitates communication between two or more people based on compatibility of mental states or thought affinity. In an embodiment, communication is facilitated between a user (e.g., a person using the tool) and one or more additional users. In this manner, so-called instant communities may be established between a user and one or more other users. Typically, the user initiating the communication desires to engage in communication in a short amount of time (e.g., on the order of seconds). The user initiating the communication typically wants to interact regarding a particular topic of interest. In this respect, material that is not particularly relevant to that topic may be of little value to the user, and may even serve as a distraction.

In an embodiment, a person using the tool enters into an interaction with another person (e.g., a live human) in very short amount of time, with very high probability, and the interaction is of high quality (e.g., relevant and informative to all parties in the interaction). An instant community may be established based on a user initiating a query or discussion regarding a particular topic of interest. Additional users, selected from a pool or population of users, may be invited to join the community. Invitations may be based on one or more factors or inputs, such as the particular topic of interest, profiles associated with each of the additional users, and one or more models (e.g., adaptive world models). In an embodiment, no groups with a focus on a specific topic are required for the successful operation of the invention, and the initiating query/discussion need not match exactly the description of interests of any individual user for them to be considered for a potential interaction with the query originator. Instead, the natural focus peer group for an interaction is always determined on-the-spot, based on who are the natural people to interact with given their closeness to the query as measured by a model of the ideas and events of the world that is continuously changing.

Embodiments described herein are contrasted with existing technologies where a user may attempt to enter into an interaction or communication with another entity (e.g., another person or user). Existing technologies may be inadequate for linking the user initiating the communication with a person knowledgeable about the topic of interest. For example, current technologies require the user initiating the communication to know who to contact about the topic of interest, or at least to identify an existing forum where the topic of interest is likely to be discussed. Social media is currently based on relationships and social groups (e.g., families, friends, friends of friends, etc.), which often is not a relevant target audience nor large enough to ensure a rich interaction regarding the user's topic of interest. Even assuming that the user otherwise could identify a suitable person to interact with, that person may have minimal incentive to participate in the interaction in a meaningful way.

Embodiments described herein are directed to the notion of instant communities which represent interactions between people that promote highly relevant but usually ephemeral interactions between people. Mechanisms for creating and managing individual instant communities, with a focus on an optimization of the individual user experience may also be provided. Additional embodiments may also include core mechanisms for making inferences about an entity's (e.g. a person) world view based on a relatively small sample of important ideas for that entity and a model of the world, represented as a graph.

Embodiments of the system can be used by participating users as a general broker of human interactions, and not just a messaging tool, greatly improving the accuracy with which the system establishes connections between people and hence the user experience. An embodiment of the system has the capability of additionally receiving information of the intention behind a query of a user, in addition to the query itself. For example, a user may have the intention of finding partners to develop an invention, resolve a critical customer situation, start a debate about a point, etc. Similarly, potential respondents to queries may feel compelled to answer to queries in given subjects but only for particular intentions behind the user's queries, and thus embodiments of the system include the capability of users to declare interest in a topic only for particular intentions. The system then uses this additional information to route requests appropriately. The user intention may be specified in a number of ways, including as special annotations in the text (for example hash tags) or as selectable options in a user interface.

In order to achieve the task of connecting users with compatible interests and/or intentions, it is necessary to employ a method that estimates how close any two users are at any given time. One technique that may be employed as part of this task is a method for estimating how close any two ideas, or sets of ideas are, where the ideas are part of a universe of ideas (or topics) that has been embedded in the system to aid reasoning. One can then use this method to estimate the probability that a user may be interested in an idea or a set of ideas, and by extension, how compatible are the originator of a query and any particular user connected to the system. The latter may be accomplished by accepting the query of a user in natural language form, and then employing a natural language module in order to extract from the query specific important key words which may be mapped into the system's universe of ideas or topic.

Further embodiments described herein provide for an estimate, for each topic or idea in a given universe, the probability or likelihood of an agent or user (human or otherwise) being interested in that topic or idea. The probability may be estimated for interest in a given topic based on the condition that the agent is interested in some set of topics and uninterested in another set of topics. The starting assumption may be that there exists an initial description of the first order, and potentially second order, relations between the topics of interest in the given universe. This description may be in the form of a graph with weighted links connecting nodes that are judged to be closely related, with the weights indicating the degree of such closeness. The terms "idea" and "topic" are used interchangeably herein to refer nodes in the graph.

The universe of nodes in principle can be very large, and can describe ideas to an arbitrary degree of precision. For example, one may have tens of millions of nodes describing ideas with every node connecting to a number of other nodes ranging from the tens to the thousands. As an example, an agent may be interested in "Kind of Blue" (the famous Jazz music album) and an embodiment may ask given this interest: What is the probability that the agent is also interested in "Village Vanguard" (the well known New York City jazz club)? What is the probability that the agent is interested in the "lydia dominant scale"? What is the probability that the agent is interested in Bill Evan's piano playing style? What is the probability that the agent is interested in "chop suey"? An embodiment may go further and ask, given the fact that the agent dislikes jazz that employs vocals, how do the probabilities of the previous questions change?

Contemporary techniques fail to provide a high degree of resolution or accuracy in regards to establishing relationships between topics in order to answer questions such as those posed above. For example, one technology or technique simply relies on the number of links or hops between two topics/nodes in a graph as an indicator of the closeness between concepts, where the larger the number of links/hops between two topics the less likely the two topics are closely related. Such a technique fails to consider the possible influence of the overall set of links between all the other nodes in the universe on the relation between the two nodes in question and also does not provide a way to discount from an estimate given that a user may indicate that a given topic is not of interest. A second technique is to create a Markov Chain from the graph described above that is specialized to a set of topics, and then estimate a stationary probability distribution through an iterative matrix*vector product. This second technique fails to adjust for a performance deteriorating effect of highly (or alternately too sparsely) connected nodes. Additionally, this second technique fails to: (1) provide a way to discount from an estimate given that a user may indicate that a given topic is not of interest, and (2) provide a number that can be easily interpreted as a probability that a user is interested or uninterested in a given subject or topic.

In a first embodiment, an assumption may be made that the user is interested in exactly one topic. In a second embodiment, that assumption may be relaxed, and a second assumption may be made that the user has expressed an interest in two or more topics.

In some embodiments, a probability distribution on a set of nodes in a universe may be combined with additional information. A Markov Chain derived from a graph may be iterated using knowledge of one topic that a user is interested in and the resulting probability distribution may be normalized, or calibrated, with another distribution. The normalization (also known as calibration step) may eliminate or significantly reduce bias towards nodes that are heavily linked in a graph inherent with plain Markov Chain techniques and simultaneously provide a number that can be interpreted as a probability estimate of a user being interested or uninterested in a topic.

Once an estimate is generated for each topic or node taken individually, an estimate may be generated for combinations of nodes. Information combining principles, based on statistical analyses and theories, may be used to produce an estimate that combines the various estimates. One example of an information combining technique is the use of log-likelihood ratios of probabilities, which can be meaningfully arithmetically added to provide the joint estimates described above, and which can also be extended to include weights describing the relative importance of the various topics for which an agent expressed an interest. Another example of an information combining technique involves combining multiple individual probability estimates by taking, for each topic in the universe of topics, the maximum probability value each of the individual estimates assigns to the topic.

In some embodiments, knowledge regarding topics that an agent has expressed a lack of interest in may be taken into account when assigning a probability estimate that the agent is interested in a given topic in the universe of topics. This task can be achieved via subtraction in the log-likelihood domain.

Each of the stages described above may be exchanged with other techniques that accomplish the same task in a different manner. For example, instead of using log-likelihood ratios to perform information combining, multiple individual probability estimates may be combined by, for example, taking, for each topic in the universe, the maximum probability value each of the individual estimates assign to this topic.

Turning now to FIG. 1, a system 100 upon which embodiments may be implemented is generally shown.

The system 100 includes a host system computer 102 and communication devices 104 communicatively coupled to one or more network(s) 106. The host system computer 102 may be implemented as one or more high-speed computer processing devices, such as one or more mainframe computers or servers capable of handling a high volume of computing activities conducted by end users of embodiments of the social interaction facilitation tool described herein. The host system computer 102 may operate as a database server and coordinate access to application data including data stored on a storage device 110. The storage device 110 may be implemented using memory contained in the host system computer 102 or may be a separate physical device. In an embodiment, the storage device 110 stores user profiles, which may be used to maintain a history or log of topics that a user or agent is interested in (or uninterested in).

The host system computer 102 may be implemented using one or more servers operating in response to a computer program stored in a storage medium accessible by the server. The host system computer 102 may also operate as a network server (e.g., a web server) to communicate with the communications devices 104, as well as any other network entities. In an embodiment, the host system computer 102 may represent a node in a cloud computing environment or may be configured to operate in a client/server architecture.

The communications devices 104 may be any type of devices with computer processing capabilities. For example, the communications devices 104 may include a combination of general-purpose computers (e.g., desktop, lap top), host-attached terminals (e.g., thin clients), and portable communication devices (e.g., smart phones, personal digital assistants, and tablet PCs). The communications devices 104 may be wired or wireless devices. In an embodiment, the communications devices 104 may represent cloud consumers in a cloud computing environment. One or more of the communications devices 104 may include a user device.

In an embodiment, the communications devices 104 may be implemented by end users of a website or web service hosted by an entity or enterprise operating the host system computer 102. The communications devices 104 may each execute a web browser for accessing network entities, such as the host system computer 102. In an embodiment, the communications devices 104 access a website of the host system computer 102 for browsing and accessing an application 112. The application 112 can implement embodiments described herein. Embodiments of the application 112 may include a social interaction facilitation tool(s) and technologies described herein. Embodiments of the application 112 may include a probability estimation tool as described herein (e.g., for inferring relations between topics, for identifying a level of interest of an agent in a topic relative to the level of interest of other agents in the topic).

The network(s) 106 may be any type of known networks including, but not limited to, a wide area network (WAN), a local area network (LAN), a global network (e.g. Internet), a virtual private network (VPN), and an intranet. The network(s) 106 may be implemented using a wireless network or any kind of physical network implementation known in the art, e.g., using cellular, satellite, and/or terrestrial network technologies.

The system 100 also includes storage devices 108 communicatively coupled to the host system computer 102. The storage devices 108 may be logically addressable as consolidated data sources across a distributed environment that includes a network (e.g., network(s) 106). In an embodiment, the storage devices 108, as well as the storage device 110, store data used by the application 112 such as, but not limited to, user profile data, as well as data used for determining commonalities between users (e.g., graphs the represent relations between topics) that are used to create conversations or other interactions.

In some embodiments, a system (e.g., application 112 of system 100) may be used to establish instant communities between people or users. In some cases, a community may be based on a particular topic of interest and may be established between users that might not know one another in advance of the establishment of the community. The community may be established based on an inferred mental state compatibility (thought affinity) between the users. The community may be established based on a model of the world's ideas and events as they unfold. The mental states of the users, including static knowledge, as well as short-term mental states influenced by events, may be incorporated in the model.

Turning now to FIG. 2A, an exemplary system environment 200 in accordance with an embodiment is shown. In particular, in FIG. 2A, a first user named Alice may initiate a communication with a service provider (SP). The communication may pertain to a particular topic that Alice is interested in. For example, if Alice recently gave birth to a baby, she may be interested in engaging in a conversation regarding the care of infant children. Alice may enter, as a natural language expression, "tending to infant children" as a topic of interest that Alice would like to discuss. Alice may also provide a message related to the topic, such as "my baby was just born—what should I do?"

Alice might not feel comfortable engaging members of her social group in conversation regarding infant care or might not know of anyone who recently had a child (in order to be able to leverage the latest information or science available regarding child care). Irrespective of Alice's reasons for wanting to engage in an instant community, Alice may initiate an interaction by entering, e.g., typing, her topic of interest (e.g., care of infant children) in a text box provided by the SP, as reflected by arrow number 1 in FIG. 2A.

In response to the entered topic of interest, the SP may identify a number of users (e.g., currently logged in users) that may be interested in Alice's specific topic at the current time. For example, at reflected by circle number 2 in FIG. 2A, the SP may identify Bob, Charlie, and Doris as users that may be the most "thought-compatible" with respect to Alice's topic of interest, at least for the time being. As reflected via arrows numbered 3 in FIG. 2A, Bob, Charlie, and Doris may be notified of Alice's topic of interest and may be invited to join in an interaction with Alice regarding the same. As part of the invitation, Bob, Charlie, and Doris may receive the topic Alice provided (e.g., "tending to infant children") and/or the message Alice provided (e.g., "my baby was just born—what should I do?"), potentially as a message. It should be noted that the system makes these judgments without necessarily Bob, Charlie, or Doris, having stated explicitly their interest in the text "tending to infant children" or "my baby was just born—what should I do?". Instead, the system analyzes the text written by Alice and also analyzes the connections between the profile of the various users of the system (including Bob, Charlie and Doris). For example, Bob may have indicated that he is a student of the Montessori education system and Doris may have recently indicated an interest in adoption.

In response to receiving the notification of Alice's thought, Bob and Doris may respond (arrow number 4 in FIG. 2A), at a time of their choosing, forming an interactive instant community between Alice, Bob, and Doris (arrow number 5 in FIG. 2A). The interaction starts whenever the first of Bob and Doris respond. The response from Bob and Doris may include a response to the message Alice provided. Within that community, Alice, Bob, and Doris may discuss caring for infant children, and potentially any other related topic (e.g., caring for teenagers). At some point, the invitation extended to Charlie may be revoked or recalled if, e.g., Charlie does not accept the invitation within a threshold amount of time, if a sufficient number of other users have started participating, if Alice indicates that the users that have joined the community are sufficient or are providing high-quality interaction, etc.

Communication parameters (e.g., the number of notified users for a given topic) may enable small communities of thought-compatible users to form within seconds of the initiation of the interaction (e.g., arrow number 1 of FIG. 2A). This can happen because statistically, the average time for the first person to respond within an ensemble of people being contacted is much shorter than the average time of responding of any given individual person.

Figure 2B:
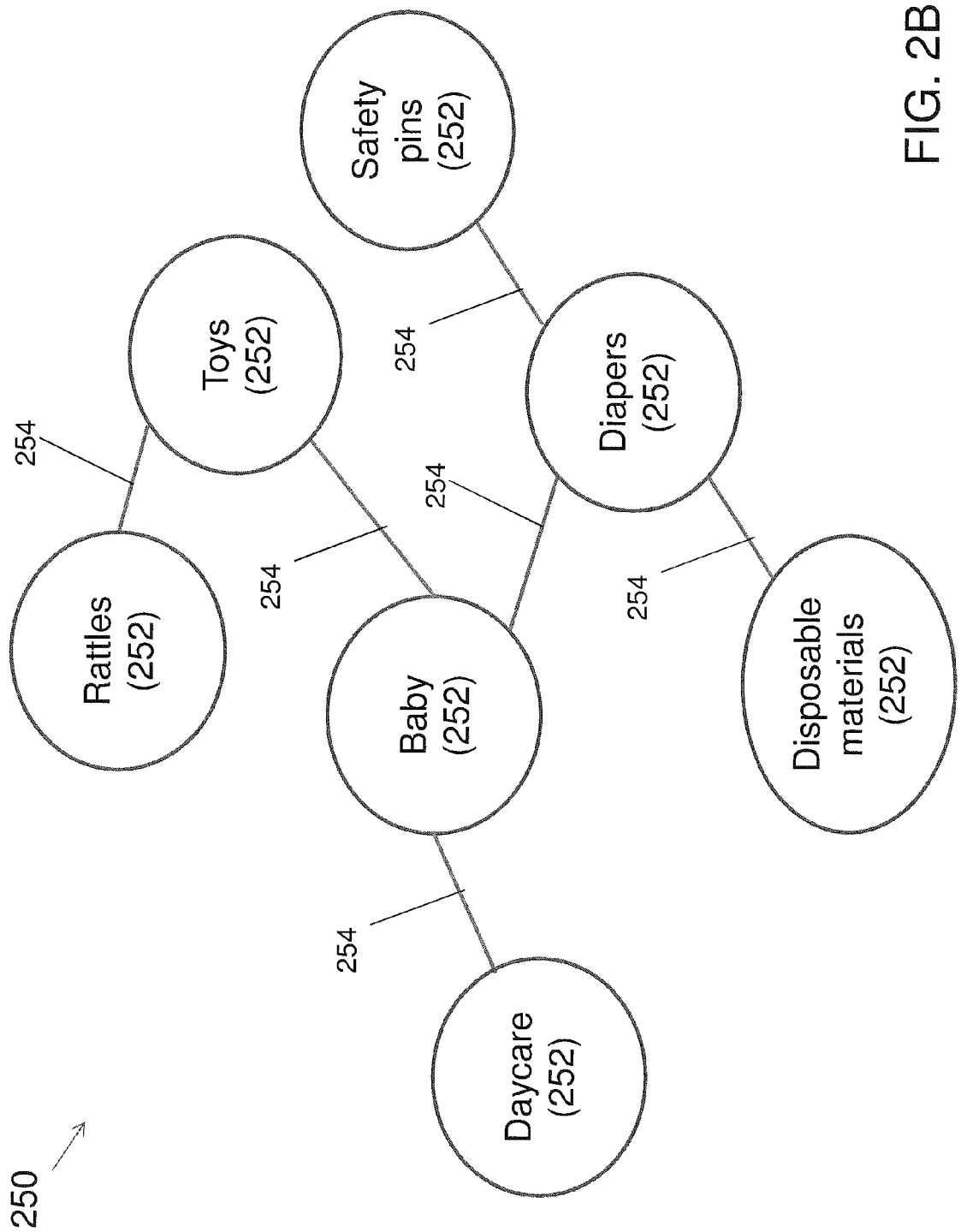
FIG. 2B illustrates a graph in accordance with an embodiment.

In some embodiments, a graph composed of nodes and edges may be analyzed. An example of such a graph 250 is shown in FIG. 2B. The graph may be a sparse graph in which the number of edges between nodes is much less than the possible number of edges between nodes. The graph may represent a model of the world, and may adapt based on information or feedback that becomes available over time. Nodes 252 may represent categories, such as topical categories. If two nodes or topics are closely related they may be directly connected to one another via an edge 254, whereas if two nodes or topics are not so closely related to one another they may be separated from one another by a number of nodes and edges. The graph may be compared to a specification of an input topic received from an initiating user and a user profile associated with a second user to determine whether the second user should be invited to engage the initiating user in an instant community or interaction. Referring to FIG. 2B, and continuing the example described above in connection with FIG. 2A, if Charlie works at a company that manufacturers rattles, that may have been sufficient to cause Charlie to be invited (arrow number 3 in FIG. 2A) to interact with Alice.

Whether a node or topic is of particular interest to a user, and to what extent, may be expressly indicated by the user. For example, a user may select a button from a webpage that the user is currently viewing, which may serve to indicate that the user is interested in the webpage and any topical information discussed in the webpage. Similarly, a user may scan a code available on a menu at a restaurant to indicate that the user likes the restaurant or a particular entrée at the restaurant. Techniques for performing a statistical inference on graphs may be used to infer a "whole world view" in order to fill in any missing information.

An embodiment utilizes the "whole world view" model of potential recipients in order to select the recipients to whom a query will be sent. In addition, the system may also utilize the "whole world view" model of the user who initiates an interaction by sending a query, in order to select said recipients. The view model of the sending user may be used to increase the system's connection-building accuracy by, for example, allowing the system to disambiguate the user's query in the case where multiple interpretations of the query are possible. For example, consider the case wherein the sending user's query is "How about them bobcats?" In this case, if the sending user is known (from the user's view model) to be much more interested in basketball compared to zoology, the system may be able to interpret the query as "How about them [Charlotte Bobcats]?" Alternately, if the sending user is known to be interested in zoology, the system may be able to interpret the query as referring to animals rather than a sports team. The sending user's view model may be formed on the basis of sources including the user's past conversations (for example, has the user had past conversations involving sports or zoology), as well as the other previously mentioned sources (such as web-sites) used to generate a "world view" model.

An embodiment uses a static world model based on the graph of hyperlinks in a website such as Wikipedia®. A user is modeled as a pair of sets of graph nodes, one describing things that are interesting and the other describing things that the user does not want to hear about (i.e., those things that are uninteresting). An embodiment supports as little as one node per user, and there is no upper limit on the number of nodes per user. Statistical inferences are performed on the graph in order to infer a "whole world view" as it applies to each user, thus filling in the blanks. In an embodiment, a probability that a user U thinks that node N is interesting is calculated, given that a set of nodes S is known to be interesting to user U and a set of nodes T is known to be avoided by user N.

This statistical inference step based on a world model allows derivation of an indirect relationship between the description of a user query and the data that is used to form a potential recipient user model, using the world model as a context that can be used to interpret the description of the user query and the recipient user data. As an example, a message about the Charlotte Bobcats can be inferred to be indirectly related to the interests of a recipient whose known interests are "American sports", even if the recipient is not explicitly known to have "Charlotte Bobcats" as an interest. This technique for reaching users is very different from techniques known in art which are commonly based on keyword matches.

Turning now to FIG. 3, an exemplary architecture 300 for building a profile for a user in accordance with an embodiment is shown. As shown, a user model 302 may serve as an input to an amplification stage 304. The user model 302 may be sparse in the sense that it may provide a limited number of clues regarding a user's interests or knowledge. The user model 302 may include information specified by a user regarding the user's interest or knowledge.

The amplification stage 304 may serve to fill-in any blanks in the user profile or graph, based on the user model 302. For example, if a node or edge in a user graph is lacking, the user model 302 may be analyzed by the amplification stage 304 in order to supply any missing information. The amplification stage 304 may output a rich user model 308, which may be stored in a database of inferred user world views 310 that may be updated as one or more models change.

In an embodiment, all or a portion of the rich user model 308, and the database of inferred user world views 310 are stored in the storage devices 108 shown in FIG. 1.

In some embodiments, a layer of geographical information (not shown) may be included in the architecture 300. A system may understand whether to choose people from a certain geographical area for a particular topic of interest. Referring to FIG. 2A as an example, if Alice is located in North America, potential users that may join Alice in an instant community may be limited to those users located in North America if, e.g., standards for child care are different in North America relative to the rest of the world.

In some embodiments, interactions or communities may spawn additional interactions. For example, and referring to FIG. 2A, if Alice requests interaction regarding caring for an infant, Bob may be able to recommend his social networking friend, Pediatrician Frank Johnson, to Alice for further discussion.

In some embodiments, an urgency tag or flag may be attached to a particular topic of interest. For example, if the topic relates to infant care and the initiation of the topic (e.g., arrow 1 of FIG. 2A) indicates that the topic was initiated from a site of a car accident as reflected in a world model, then the communication request may be transmitted to a large segment of a population, such as those pediatricians who have had experience treating infants that have been in motor vehicle accidents. The communication request may also be transmitted to first responders that may be located nearby Alice or the site of the car accident in order to ensure that emergency assistance may be rendered in a timely fashion, if needed.

In terms of selecting a candidate pool of users to invite to an instant community, as described above, some users may be more knowledgeable or more responsive than others regarding a given topic. In some embodiments, invitations may be extended to "pillars of the community" (e.g., those users that are knowledgeable and responsive) and to less knowledgeable/responsive users. The invitations may be extended to ensure that the pillars of the community are not overloaded with excessive invitations and to ensure that those with less knowledge regarding a given topic are "seeded" with knowledge that they can help to disperse in the future (e.g., as a member of future communities).

In some embodiments, a distribution in terms of the participation of users in a community may be shaped. Invitations can be extended at multiple times. For example, sequential invitations may be used where, e.g., a small number of users may initially be invited. Based on response times, additional invitations may be extended to additional users to join a community. A monitoring technique may be used to detect when a user is typing, in order to determine whether additional invitations should be extended.

In some embodiments, users in a community may be able to see communications sent by other users in the community. Conversely, in some embodiments, one or more users might not be able to see communications sent by another user or set of users, which may be used to ensure privacy of communications.

Communities may be browsed by one or more users. Such browsing may occur in connection with a webpage or any other interface. In some embodiments, communities that are visible for browsing purposes may be selected or filtered from a larger set or pool of communities. Such selection/filtering may be based on topics that are likely of interest to a particular user, or are topics that the user is knowledgeable about. In some embodiments, correlations between interests of a user can be exploited in order to provide for enhanced resolution or accuracy in terms of extending an invitation to a user to join a community or suggesting a community for a user's perusal or review. In some embodiments, when a user initiates an interaction (e.g., arrow number 1 in FIG. 2A), a new community may be established, and users or experts from a related community may be asked to join the new community. In this manner, the interaction in the related community might not be interrupted as a result of the new community. In some embodiments, rather than establishing a new community, the user's action of initiating the interaction may cause the user to join an existing, related community.

The lifetime of a community may be a function of one or more parameters. For example, if a community has been established for a number of hours, additional users may be precluded from joining the community. If a community has been established for a time in an amount greater than a threshold, the community might not be visible when users browse for communities to join. In some embodiments, the lifetime of the community may be a function of the nature of the topic. For example, rare topics may be kept open or visible for a longer period of time. Similarly, frequently requested topics may be kept open or visible for a longer period of time to absorb a lot of common or related questions into the same conversation.

In some embodiments, a knowledgebase associated with a system (e.g., system 100) may be seeded based on initial interactions. Such initial interactions may be elicited from an initial pool of users in order to expand the topical knowledge available in the system. Thereafter, the knowledgebase may grow based on continued use of the system. The size or capacity of the system may be a function of the number of users, the activity of the users (e.g., the frequency with which a user participates, the length of time the user participates, etc.), the processing speed available, the likelihood that a request to initiate an interaction spawns a new community versus being merged into an existing community, etc.

Embodiments may be used to create instant communities (based, for example, on geographical information, interests, expertise, closeness in time) (e.g., I'm at concert X, does someone have a spare ticket?, I'm looking to buy a product X, how long is the line that you are in?), for expert news about niche areas (e.g., Did you understand, from the product announcement, how technology X will be applied to product Z?), for recent events (e.g., What did Smith just say about company XYZ earnings?), and for localized dissemination of important information (e.g., Did I just feel the ground shaking? Was that an earthquake?). As compared to blogs and web pages which may contain stale and static (non-interactive) data, embodiments described herein include data that is interactive.

An example of how an embodiment would process a user question follows. A user, Patty, enters a question: "I'm with a customer. He just asked me about 'Hadoop'. Can someone tell me how it connects to Websphere?" The question is parsed and the concepts "customer", "Hadoop", "Websphere", and "Hadoop connects Websphere" may be extracted. The system estimates how these concepts are related with the concepts that we believe any given individual user is interested in. We emphasize that these users need not have expressed any direct interest in the extracted concepts, as we rely on a technique for estimating the strength of the relation between any two ideas that are represented in a graph. The user then makes a draft list of users who may be able to help Patty. The system also infers form Patty's question (and any other information available) that Patty is at a client and that therefore the issue is urgent. Based on this, the system communicates Patty's question to a relatively large segment of the draft list. In an embodiment, the draft list may be limited, for example, to only those who work at the same company as Patty does or who work for the company that sells the products mentioned in her question.

In another example, Pat is shopping at the Palisades Mall when he sees a face that looks familiar. He sends a question "Did I just see Mrs. Movie Star enter the Palisades Mall?" The system parses Pat's question and realizes the significance of geographic locality. It communicates the question to a list of users that are current shoppers (and possibly also those who often shop at the Palisades Mall), possibly prioritizing on the based on interest in celebrities or other criteria. A few second later Pat starts getting replies from fellow shoppers with more sightings, or lack of sightings, of Mrs. Movie Star. In addition, Pat may also get a reply from a person who is not currently at the Palisades mall, but who often shops there letting them know that there is an impersonator of Mrs. Movie Star who is often at the Palisades mall. Pat may switch into chat-mode so as to broadcast all of the responses to the other users. This builds an instantaneous co-located geo-community.

Figure 4:
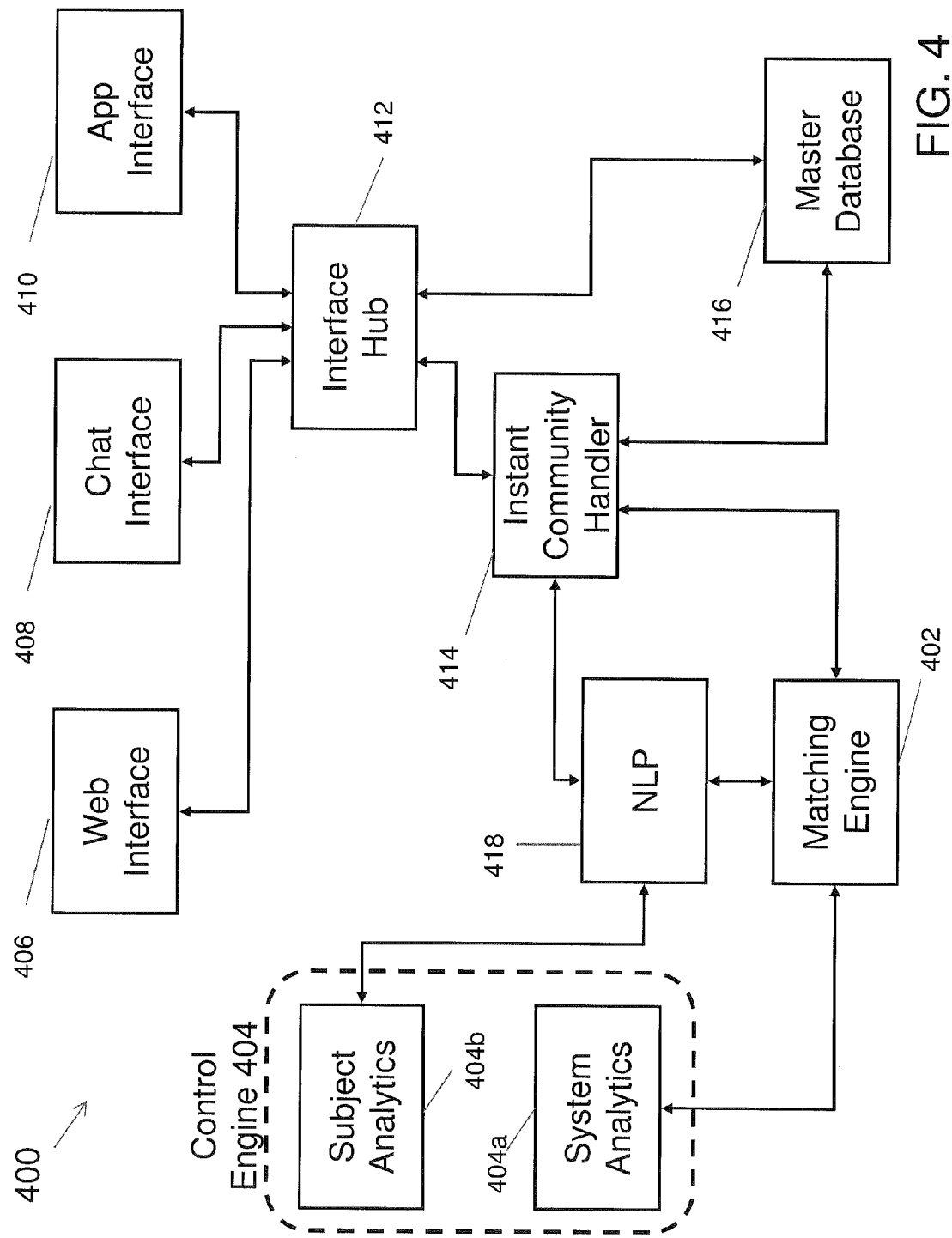
FIG. 4 illustrates a system environment for implementing instant communities in accordance with an embodiment.

Turning now to FIG. 4, a system environment 400 for implementing instant communities in accordance with an embodiment is shown. The system 400 may be implemented in connection with the system 100 of FIG. 1.

As shown, the system 400 may include a matching engine 402. The matching engine 402 may be used to match people using prior information about their interests and the specific requests and contents of conversations within instant communities.

The system 400 may include a control engine 404, denoted in FIG. 4 by a dashed oval/circle. The control engine 404 may facilitate a forming and disbanding of communities based on models of human behavior to ensure a thriving and well regulated system. The control engine 404 may provide for such features by optimizing: the size, scope, livelihood and diversity of instant communities, how many users are invited to participate in, or initiate the establishment of, an instant community, the dynamics of how users are added to or removed from an instant community, application of statistical methods to preserve users' privacy and prevent external malicious "social engineering."

The system 400 may include one or more interfaces, such as a web interface 406, a chat interface 408, and an application (app) interface 410. The interfaces may be associated with a front end interface that may include website, mobile application, and toolbar application design and integration interfaces for facilitating communication with messaging services. The interfaces may be associated with a back end interface that may include natural language processing techniques and capabilities. The interfaces may be used to receive and/or store user preferences and interests—such storage may be facilitated in remote servers in some embodiments. The interfaces may be coupled to an interface hub 412. The interfaces may communicate live data and user preferences to the interface hub 412.

In some embodiments, each user may be connected to a unique interface hub (e.g. interface hub 412) during a session. The interface hub 412 may route a new question or interaction request to an instant community handler 414. The instant community handler 414 may notify a master database 416 of user connections and disconnections. The interface hub 412 may route instant community and system messages to the interfaces (e.g., interfaces 406-410). The interface hub 412 may keep track of instant communities corresponding to each user connected to that interface hub 412.

The instant community handler 414 may receive text and user identifiers from the interface hub 412. New questions or interaction requests may be routed by the instant community handler 414 to an NLP engine 418. Given a list of subjects from the NLP engine 418, the instant community handler 414 may query the matching engine 402 for an instant community and a (new or existing) contact list. In response, the instant community handler 414 may receive the instant community and contact results from the matching engine 402. The instant community handler 414 may route the question or interaction to the contacts (e.g., as part of an invitation). The instant community handler 414 may manage responses and may withdraw questions or interactions as needed. The instant community handler 414 may notified the master database 416 of any new instant communities or changes or modifications to an existing instant community.

The instant community handler 414 may provide support for existing instant communities. For example, the instant community handler 414 may route instant community messages to users. The instant community handler 414 may route instant community messages for to the NLP engine 418 for filtering (e.g., second-order filtering). The instant community handler 414 may manage the demise of an instant community, and may notify a master database 416 of destruction of an instant community. The instant community handler 414 may contact the matching engine 402 for a contact list on subjects related to a given instant community or for other existing instant communities to merge with.

The matching engine 402 may receive a list from the instant community handler 414. The list may include subjects and/or weights. The matching engine 402 may produce a sorted list of users and existing instant communities related to the subjects received. The matching engine 402 may receive user status and instant community status updates from the master database 416 (potentially by way of the instant community handler 414). The matching engine 402 may receive parameters from a system analytics engine 404a, which may control how the listing is done.

The master database 416 may maintain a list of all users including profile, interests, credentials, activity level, history, and current participation. The master database 416 may maintain a list of current instant communities and connected users. The master database 416 may update the data associated with the matching engine 402. The master database 416 may be used by the control engine 404. The master database 416 may be updated by the instant community handler 414 and/or the interface hub 412.

The system analytics engine 404a may track dynamics of the overall system 400. The system analytics engine 404a may act on control hooks such as hooks in the matching engine 402 to guarantee stability of the system 400.

A subject analytics engine 404b may track the evolution of topical interests. The subject analytics engine 404b may provide data or feedback regarding the evolution to the NLP engine 418.

Figure 5:
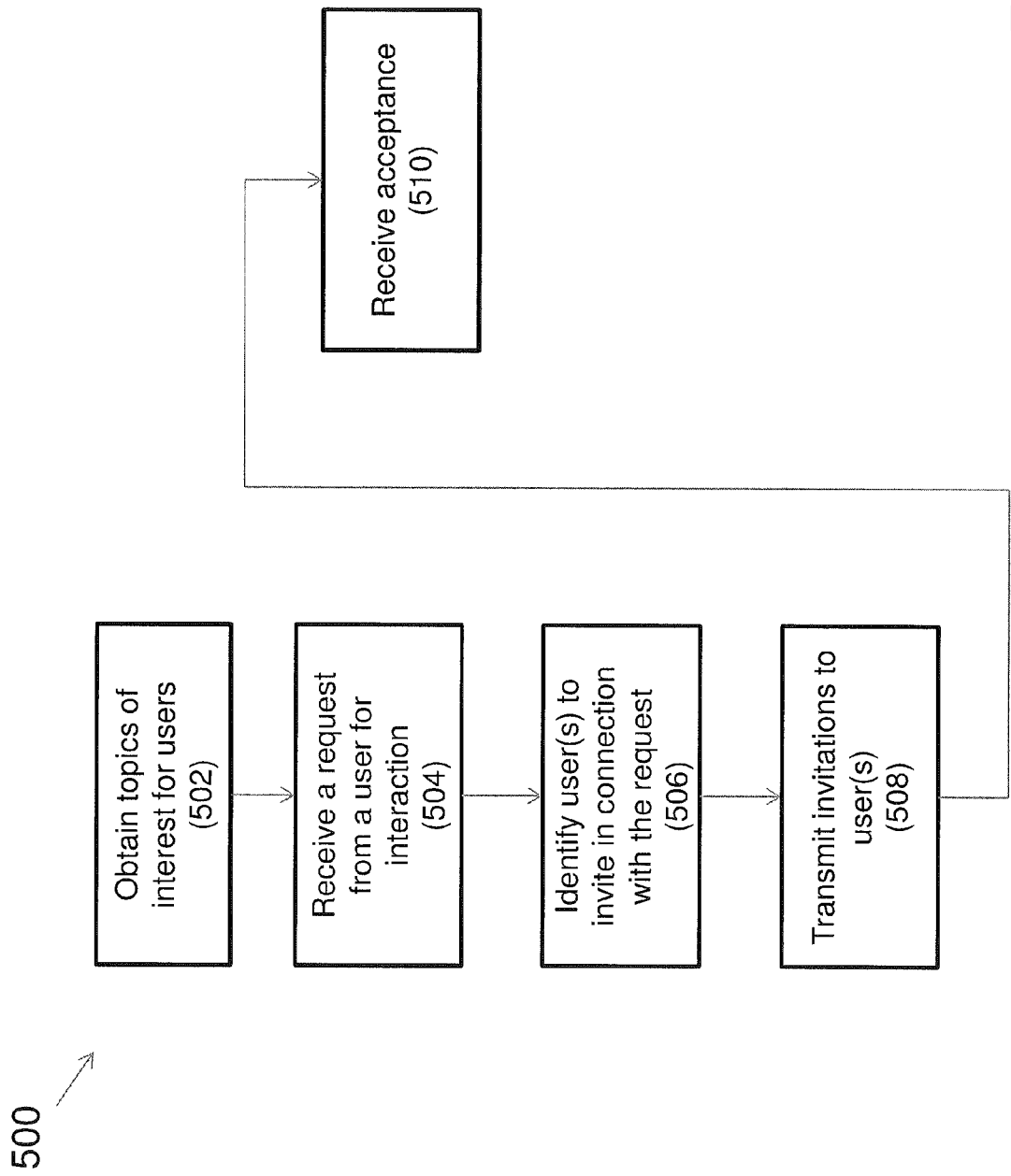
FIG. 5 illustrates a flow chart of an exemplary method in accordance with an embodiment.

Turning now to FIG. 5, a flow chart of a method 500 is shown. The method 500 may execute in connection with one or more components, devices, or systems, such as those described herein. The method 500 may be used to form an instant community.

In block 502, topics of interest for users may be obtained. For example, a first user may enter or indicate those topics that she is interested in, potentially in connection with a user profile. In some embodiments, topics of interest for a user may be inferred. For example, if the first user viewed web pages related to copyrights and trademarks, it may be inferred that the first user is generally interested in intellectual property, and intellectual property may be saved as a topic of interest for the first user.

In block 504, a second user may request interaction regarding an identified topic of interest. For example, the second user may request interaction regarding a question she has about obtaining a patent for an invention. For example, the second user might not know what sections of a patent application are needed to comply with patent office rules of practice. The second user may pose the question using one or more natural language expressions or messages, such as "how do I prepare a patent application?" and "what sections are needed?"

In block 506, logic may decompose the request/natural language expression of block 504 to identify one or more users to invite to interact with the second user. The users to invite may be identified based on an affinity of thought between the request/natural language expression and the information that is available in user profiles. In the context of preparing a patent application, the first user described above in connection with block 502 may be identified as a user that should be invited based on the first user's interest in copyrights and trademarks.

One or more graphs, composed of nodes and edges that may relate or connect topics to one another, may be consulted to identify the users to invite in block 506. The graph may represent a model of the world that may adapt or change over time. The graph may be based on information obtained from one or more sources. For example, the graph may be based on a user profile or user model (e.g., user model 302 of FIG. 3) and a world model.

In order to ensure that the users to invite respond to the request in a timely manner, the users to invite may be selected in block 506 from a pool of users that are active or currently logged-in to a system or platform.

In block 508, invitations to the user(s) identified in block 506 may be transmitted. The transmitted invitations may include one or more of the natural language expressions or messages of block 504. Thus, the first user interest in copyrights and trademarks may receive an invitation regarding the preparation of a patent application. As part of block 508, an instant community may be formed.

In block 510, acceptances to join in the interaction/user community may be received from one or more of the users who received the invitations transmitted in block 508. Those users that accepted the invitation may be placed into the instant community with the (second) user that initiated the request in block 504, such that the users that are members of the instant community will be able to interact with one another regarding the topic(s) of interest (e.g., patent preparation and the sections of a patent application).

The method 500 is illustrative. In some embodiments, additional blocks or operations not shown may be included. In some embodiments, a block or operation (or a portion thereof) may be optional. In some embodiments, the blocks or operations may execute in an order or sequence that is different from what is shown in FIG. 5.

As described above, the notion of an instant community may be used to enable users, who otherwise would not necessarily know of one another, to interact with one another to discuss one or more topics of interest. In this respect, a system or platform may serve as a personal interaction broker that may bring users together based on the thoughts, views, or interests of the users. Contextual relationships may be formed between natural language expressions and graphs to determine which users should be invited to engage in an instant community.

As described above, in some instances it may be difficult to obtain quality or adequate participation in an instant community. For example, users might not have an incentive to participate in a conversation regarding a given topic, and even if they do participate, might not be inclined to participate to the fullest extent possible. Similarly, the owner or operator of a system (e.g., systems 100 and 400) might not have an incentive to provide an instant community service unless some incentive is provided for operating the service.

In order to incentivize an owner/operator to provide an instant community service, an owner or operator of the service may provide advertisements that are contextually relevant to a topic associated with an instant community. Such advertisements may be displayed in a sidebar of, e.g., a webpage associated with the instant community. Vendors or advertisers may provide their advertisements, along with a specification of a budget, keywords, and topics of interest. The service provider of the instant communities may select which advertisements to present in a given instant community, or to a given user of an instant community, based on the input provided by the vendors. The service provider may change the advertisements presented over time, which may be based on how the interaction or conversation evolves in the instant community over that time frame. As used herein, a conversation is an example of one type of interaction.

The service provider may charge a vendor based on the number of times an advertisement of the vendor is presented, based on an identity of a user that the advertisement is presented to, etc. The service provider may charge the vendor an additional amount if a user clicks on or selects an advertisement. Still further, the vendor may be charged an additional amount if the user purchases a product or service from the vendor. A fraction of the fees collected by the service provider may be shared with one or more users of the instant community, e.g., by depositing a share to user accounts.

A detection system may be implemented to ensure that users do not collect rewards (e.g., monetary rewards or shares of fees) for starting or partaking in an instant community in a fraudulent manner. For example, an initiating user of an instant community may need to provide positive feedback for a second user in the instant community in order to allow the second user to receive a reward. In this manner, quality participation on the part of the second user in the instant community may be incentivized.

Techniques may be used to ensure that an initiating user and a second user do not attempt to partner-up in the same instant community (solely) for the purpose of obtaining rewards. For example, random selection techniques may be used to reduce the likelihood of a first user and a second user repeatedly participating in the same instant communities. In some embodiments, the first user and the second user may be precluded from both participating in more than 'n' instant communities in a given time period (where 'n' is a number), or their rewards may be curtailed or reduced relative to some baseline for participation in additional instant communities.

In some embodiments, a system is provided that enables anonymous conversations on the Internet. The system may include a conversation broker, participants or users, and advertisers. A participant may initiate a conversation by sending a first message in the system. The broker may relay the first message to multiple participants and advertisers of its own determination. The broker may add or remove participants and advertisers, at any time according to the broker's own determination. The participants may engage in conversations, which may include sending one or more messages in response to previous messages. The broker may auction the conversation content, keywords, sentences, and any other relevant information to the advertisers.

In some embodiments, advertisers may bid money to join a conversation. An advertiser may include a bot or a real person. If a broker allows an advertiser to join, the broker may withdraw funds from an advertiser's fund or account. To the participants, advertisers may be identified as advertisers or as another participant.

Advertisements may be displayed in-line with a conversation or in a separate advertisement area. Advertisements may be asymmetrically displayed or presented, with each participant possibly observing a different advertisement. Advertisements may be hyperlinks that, upon participants clicking on them, the broker may withdraw bid amounts from advertisers' funds or accounts. Advertisements may be actual conversations that the advertiser contributes. Advertisements may change as the conversation changes.

Participants or users may receive monetary awards from a broker for joining and engaging in a conversation or interaction. The broker may make participants aware of the award amounts so that the participants can prioritize and change the level of their participation. Participants may vote on other participant contributions so that the broker can adjust award amounts.

We now turn our attention to the description of a core component of the architecture described earlier. The reader may appreciate that in order to achieve the task of connecting users with compatible interests and/or intentions, it is necessary to employ a method that estimates how close any two users are at any given time. We adopt the viewpoint that we will achieve this by building on a universe of concepts modeled as a graph, where the nodes of the graph are concepts or topics and where the edges in the graph represent first order relations between these concepts, with potential weights in the edges. Once in possession with the graph, one technique that may be employed as part of the task of connecting users is a probability estimation tool for estimating how close any two ideas, or sets of ideas are, where the ideas are part of the universe of ideas (or topics). One can then use this method to estimate the probability that a user may be interested in an idea or a set of ideas, and by extension, how compatible are the originator of a query and any particular user connected to the system. The latter may be accomplished by accepting the query of a user in natural language form, and then employing a natural language module in order to extract from the query specific important key words which may be mapped into the system's universe of ideas or topic.

Figure 6:
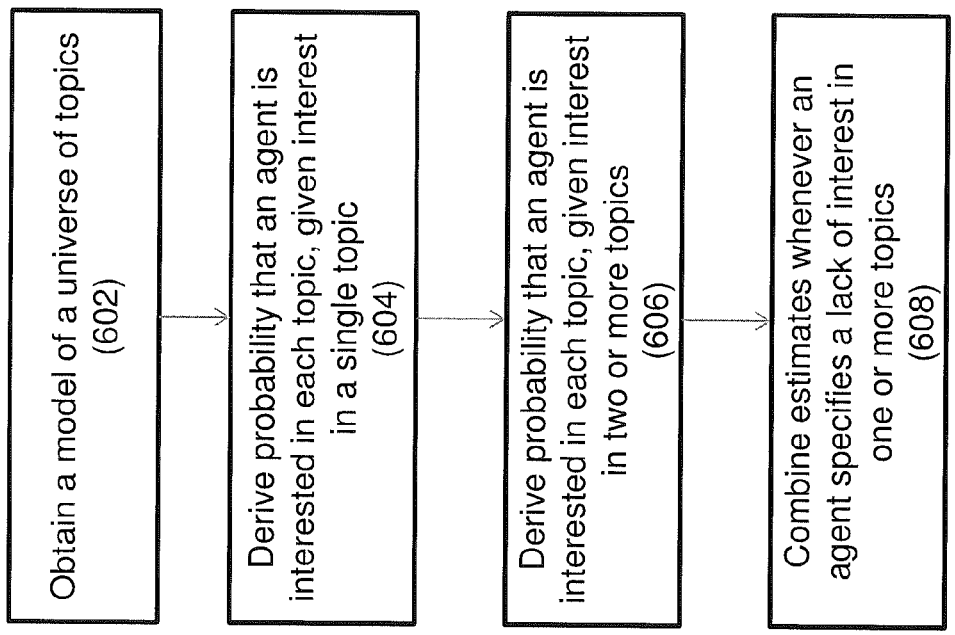
FIG. 6 depicts a flow chart of an exemplary method for computing a probability estimation in accordance with an embodiment.

Referring now to FIG. 6, a probability estimation tool, implemented for example by the application 112 shown in FIG. 1, may be configured to operate in connection with one or more phases or stages. An example of a method 600 for estimating a probability that an agent in is interested in a given topic in a universe of topics is shown in FIG. 6. For example, a first stage 602 may be used to obtain a model of the universe of topics. A second stage 604 may be used to derive, for each topic in the universe, the probability that an agent is interested in the topic given that the agent has expressed an interest in exactly one topic. A third stage 606 may be used to compute estimates of the probability of an agent being interested in the various topics of the universe given that the agent has expressed an interest in two or more topics. A fourth stage 608 may be used to combine estimates whenever an agent specifies one or more topics that the agent is not interested or uninterested in.

Regarding the first stage 602 described above in reference to FIG. 6, an assumption may be made that a square stochastic matrix P is available with each of the dimensions being equal to the number of topics (e.g., on the order of one hundred thousand topics, one million topics, five million topics, ten million topics, etc.) in a given universe of topics. $P\_\{i,j\}$ may be indicative of the entry on the $i^{th}$ row and the $j^{th}$ column, and may be interpreted as the probability that one jumps from state j to state i in the sense of Markov Chain theory, so that the columns of the matrix P each add individually to one (1). The probabilities may be assumed to have been chosen so as to reflect the first order relations that one can express for the topics of the universe. Topics may be identified with individual web pages and the first order links between the topics may be given by the hyperlinks between the web pages (e.g., Wikipedia web pages, enterprise intranet web pages, general web pages). In addition, hyperlinks need not be present as unstructured information processing techniques may be used to extract implicit links between two topics based on the language describing each topic. The relative number of hyperlinks going for one page to another given page can be used to determine the strength of the connection between those pages. Additionally, an estimate of the importance of a hyperlink within a page (e.g., the location of the hyperlink within the page) can be used to further impact what probability is assigned to it when populating the matrix P.

When building a graph from a hyperlinked structure of a set of web pages, it may be useful to artificially add and/or remove links, and remove one or more nodes to increase the quality of the corresponding graph. For example, a node may be associated with an index of many pages that are only loosely related to each other. Such node, together with its links, may be introducing spurious connections since the index is not meant to illustrate true connections between topics, and rather is just a mechanism for navigating the web. Eliminating these types of nodes, together with their links, can be used to obtain or isolate true indications of relations between topics. An example is the consideration of "disambiguation" pages in Wikipedia. These pages contain lists of topics whose textual description is very similar (e.g., Deep Blue the computer and Deep Blue the movie), but that mean different things. An embodiment would remove these disambiguation nodes from the graph (however, they may be used for other purposes in other algorithms).

In a reverse situation, it may be appropriate to add links where there are none, such as when there exists a link from a first topic to a second topic but no link from the second topic to the first topic. If the existence of the link from the first topic to the second topic indicates a relation between the first and second topics, then it may reasonably be assumed that a link from the second topic to the first topic should be added. Adding such a link can improve the overall performance of the algorithms described herein. Such added links may be given the weight of a regular or typical link, or can be given a lower importance or weight given the fact that they have been added artificially.

Regarding the second stage 604 described above in reference to FIG. 6, the second stage 604 may be based on the use of a generalized form of a matrix eigenvector algorithm. In this technique, a Markov Chain transition probability matrix P may be replaced with the matrix provided in Equation #1 as follows:

$$(1-a)P + av^o[1\ 1\ 1\ \ldots\ 1]$$ Equation #1

Equation #1 may represent, or be an example of, a statistical traversal experiment. In Equation #1, 'a' represents a parameter between zero and one, '$v^o$' represents a probability vector that is equal to one in the entry corresponding to the topic on which an agent expressed an original interest and zero everywhere else, and the '[1 1 1 . . . 1]' notation represents a row vector full of ones with a length equal to the number of topics in the universe (which is also equal to the number of rows/columns in P). Thus, $v^o$[1 1 1 . . . 1] represents a square matrix with each column equal to $v^o$. The matrix in Equation #1 may be regarded as a Markov chain that has been specialized to a specific topic. Pictorially, with probability 'a' one goes back to the node describing the topic an agent has expressed an interest in, and with probability (1−a) instead, a step is taken in the Markov Chain described by the stochastic matrix P.

Assuming that the Markov Chain in Equation #1 has a stationary probability distribution, the stationary probability distribution may be regarded as a result of a "random surfer" experiment of a web surfer that starts at a specific web page of interest and then finds or clicks on links at random, always going back to the starting web page with some probability. The resulting stationary probability distribution may provide an indication of how often any given web page would have been visited, with a certain preference to stay to pages close to the starting web page. The stationary probability distribution may be estimated by repeated matrix 'x' vector operations, which converge to the stationary distribution fairly quickly within a reasonable margin of error.

The stationary probability distribution (or estimate thereof) may be biased towards nodes that have many inward links, even if these nodes are very far apart from the node associated with the initial topic (as described by the vector $v^o$). This is because such nodes effectively act as attractors. For example, in Wikipedia one of the most popular nodes (or topics) using links as a metric is "U.S.A.". Even if one expressed an interest in, say, "Patagonia" or "Dim Sum" it would be observed that the corresponding stationary distributions specialized to Patagonia or Dim Sum still give high probabilities to U.S.A. This may be an undesirable effect that can result in erroneous estimates of probabilities of interest.

An assumption may be made that 'W' denotes the stationary distribution of Equation #1, or an estimate thereof, for some choice of 'a', and 'Z' denotes a "normalizing" distribution. The normalizing distribution could be, for example, an estimate of the stationary distribution of the matrix P. The normalizing distribution could be an estimate for the stationary distribution of a matrix of the form of Equation #1 but where the vector $v^o$ is replaced with a probability vector with all entries equal to the same probability (e.g., a uniform distribution) In this latter scenario/embodiment, there is also a potential choice for the parameter 'a' that need not agree with the choice of 'a' made when computing 'W'. Alternately a probability distribution different from the uniform distribution could be chosen to reflect a different assumption about the level of interest on each topic for a reference population.

In any event, 'Z' may correspond to the stationary distribution when one does not have any specific topic as a topic of interest, and thus rather reflecting the interests of a population at large, as opposed to the interests of only one specific person or agent. The stationary distribution may, at least in principle, measure the popularity of any given topic purely in the basis of its topological advantages (e.g., many inward links) or disadvantages in the graph. The examples given above for Z will have that general property.

Once in possession of both 'W' and 'Z', an estimate of the probability that an agent is interested in a topic T may be calculated through Equation #2 as follows:

$$f(g(W(j))/(g(W(j))+g(Z(j))))$$ Equation #2

Equation #2 may be used to infer strength of relations. In Equation #2, W(j) denotes the $j^{th}$ entry of the vector W and similarly for Z, and f( ) denotes a "filtering function" described further below. As described further below, the value W may be referred to as the "raw scores". Initially, it may be assumed that f(.)=1, corresponding to a condition of no filtering. Similarly, the function g( ) may be used to preprocess the vectors W and Z for reasons described further below. Initially, it may be assumed that g(.)=1.

If the distribution W, which is specialized to a fixed topic, has the property that W(j)=Z(j), where Z is not specialized to a topic, then the ratio expressed in Equation #2 is equal to 0.5, which may be interpreted as indifference (e.g., do not like nor dislike). Thus, if Z and W agree on j, that may mean that there is no evidence that the specialization present in W resulted in an improved rate of visiting node j compared to the "vanilla" or ordinary Z(j).

For the sake of discussion, if W(j)=10 Z(j) (e.g., the node j is visited ten times as often under the specialization to a given topic when compared to Z), then the ratio in Equation #2 is equal to 10/11, or approximately 0.9. This value of 0.9 may be interpreted to mean that the likelihood that the agent is interested in j is equal to 0.9.

Similarly, if W(j) is very small compared to Z(j), then the ratio in Equation #2 will be close to zero, which may be interpreted to mean that the agent is less likely to be interested in such a topic j than a general population.

In the format described above, the result of the ratio expressed in Equation #2 may be interpreted as a probability of interest/lack of interest or like/dislike.

The filtering function g in Equation #2 may be incorporated to account for the fact that in many practical situations the range over which Equation #2 varies may be concentrated in only some regions within a [0, 1] interval. Typically, a function like:

$$g(x)=x^b \qquad \text{Equation \#3}$$

for some exponent b (e.g., b=0.5) may produce good results. Similarly, the function f may be used to further control the resulting probability estimates. For example, it may be useful to clip the ratio expressed in Equation #2 so that is it always equal to or greater than a threshold. Thus, one can express the function f as:

$$f(x)=x \text{ if } x > x\_0, \text{ and} \qquad \text{Equation \#4}$$

$$f(x)=x\_0 \text{ if } x \leq x\_0 \qquad \text{Equation \#5}$$

Regarding the third stage 606 described above with reference to FIG. 6, it may be assumed that two probability of interest estimates, denoted as E1 and E2, are available as being derived from Equation #2 starting from two different initial topics. The estimates E1 and E2 may be combined into a single estimate, E, using a number of techniques. For example, the maximum of E1 and E2 could be used for E, e.g.:

$$E=\max(E1,E2) \qquad \text{Equation \#6}$$

Another possibility is to regard each of E1 and E2 as being derived from statistically independent experiments (conditional on the experiments' outcomes) that attempt to answer the question of the probability of being interested (1.0=100% certainty of being interested) versus not interested or uninterested (0.0=100% certainty of being uninterested). From this point of view, the concept of log-likelihood ratios can be used to formally combine the two independent observations. In particular, if p1, p2, . . . pM are the independent estimates of the probability of interest, the combined probability may be computed from:

$$\text{LLRinv}(\text{LLR}(P1)+\text{LLR}(P2)+ \ldots +\text{LLR}(PM)) \qquad \text{Equation \#7}$$

where $\text{LLR}(x)=\log(x/(1-x))$ and LLRinv is the corresponding inverse function to LLR(x). This formalism can support weighting the strength of each of the individual topics by adding a factor '$k_x$' in front of each of the LLR terms, e.g.:

$$\text{LLRinv}(k_1\text{LLR}(P1)+k_2\text{LLR}(P2)+ \ldots +k_m\text{LLR}(PM)) \qquad \text{Equation \#8}$$

Regarding the fourth stage 608 described above with reference to FIG. 6, the appropriate '$k_x$' factors in Equation #8 may be made negative to combine estimates whenever an agent specifies one or more topics that the agent is not interested in.

As one skilled in the art would appreciate, a graph may be used to model relationships between topics. For example, each node of a graph may represent a topic, idea, or concept. Nodes may be connected to one another via one or more edges or links, and potentially one or more other nodes.

A topical bundle may be defined as a set of nodes, where the set includes at least one node. There may a number 'M' of topical bundles in the world. It may be of interest to determine the relative importance of the M topical bundles to one another.

For example, referring to FIG. 7, a raw score table 700 is shown, where the numbers in the table are the natural logarithm of the raw scores. "Parallel Processing", "GPGPU", "Data mining", "Beethoven", "Classical music", "Hip hop", and "USA" may be representative of topics or nodes. The topics are shown in the vertical column or portion of the table 700 as query topics. The query topics relationships to the topics expressed as personal topics (the top horizontal row in FIG. 7) is reflected via the numerical values shown in FIG. 7. The numerical values represent the closeness or proximity of a query topic to a personal topic, with a value of '0' representing a high degree of closeness or proximity. As the values get further away from '0', the query topics are less related to the personal topics.

As shown in FIG. 7, a query topic of "data mining" is only tangentially related to a personal topic of "parallel processing" as reflected via the value '−13' in FIG. 7. A query topic of "USA" is more related to the personal topic of "parallel processing", as reflected via the value '−8' in FIG. 7. It strains credibility to suggest that "USA" is more closely related to "parallel processing" than is "data mining", which serves to reflect the deficiencies of the prior art.

In some embodiments, for a given topical bundle, a raw score may be assigned to every other topical bundle in the universe, the score being an attempt to measure the strength of the relation between the given topical bundle and every other topical bundle. The raw score may be assigned using a raw scoring function.

To compute the raw score, the raw scoring function may rely on a number of inputs. The inputs may include: (1) a graph representing a universe of ideas or topics, with each topic being a node and each link in the graph denoting a first order relation, (2) a probability distribution on the M topical bundles, characterizing the interests of the general population of topical bundles, and (3) at least two topical bundles, denoted as A and B for ease of illustration.

The output of the raw scoring function may provide an answer to the question: what is the relevance of the topical bundle A to the topical bundle B, relative to the general population of topical bundles. It may be noted that the probability distribution on the topical bundles, coupled with the raw scoring function (applied to each individual topical bundle) may imply in turn a distribution of raw scores for each of the M topical bundles.

An algorithm may be used in connection with the raw scoring function to determine or compute the raw score. As a first task or method 800 of the algorithm, an estimate of the probability distribution for the topical bundles may be obtained.

Figure 8A:
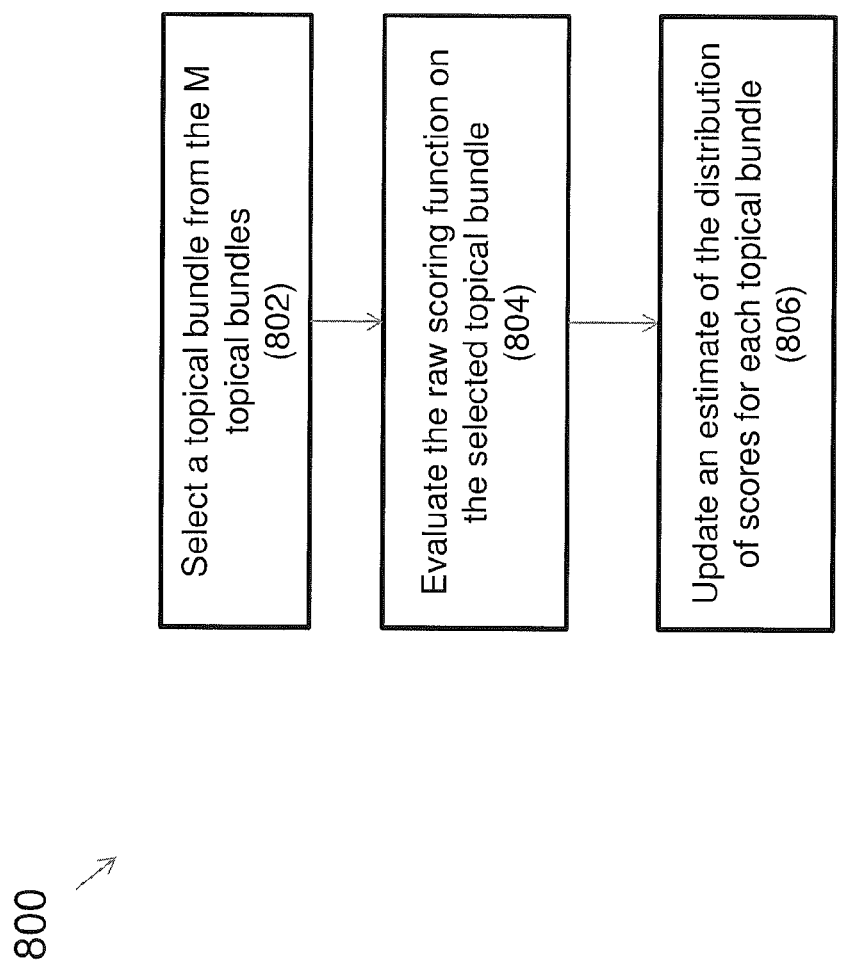
FIG. 8A depicts a flow chart of an exemplary method used to compute a score in accordance with an embodiment.

As shown in FIG. 8A, the first task 800 may include a number of operations. For example, in an operation 802, a topical bundle may be selected, potentially at random, from the M topical bundles. In an operation 804, the raw scoring function may be evaluated on the selected topical bundle of operation 802. In an operation 806, an estimate of the distribution of scores for each topical bundle may be updated based on the results of the operation 804.

To accomplish the operation 806, a parametric model may be assumed for the distribution (i.e., it is assumed that the distribution adheres to a parametric model). For example, the tail of the distribution may be assumed to be modeled as a Pareto distribution. A parametric model may be used to reduce the storage of data relative to an arbitrary distribution, as the potential expense of using a model that does not apply equally to all topical bundles.

Further optimizations are feasible. For example, if the raw scoring function is linear in the sense that the raw scoring of a topical bundle with two topics can be computed by adding the raw scoring of the individual topics, then it may be possible to implement the first task 800 by limiting the topical bundles being considered to be topical bundles with a single topic inside of them.

Another optimization is that the estimate in operation 806 need not be of the same nature for all topical bundles. For example, for some topical bundles, a parametric estimate may be adequate. For some topical bundles a more complex estimate may be computed without making any assumptions about the shape of the distribution.

Figure 8B:
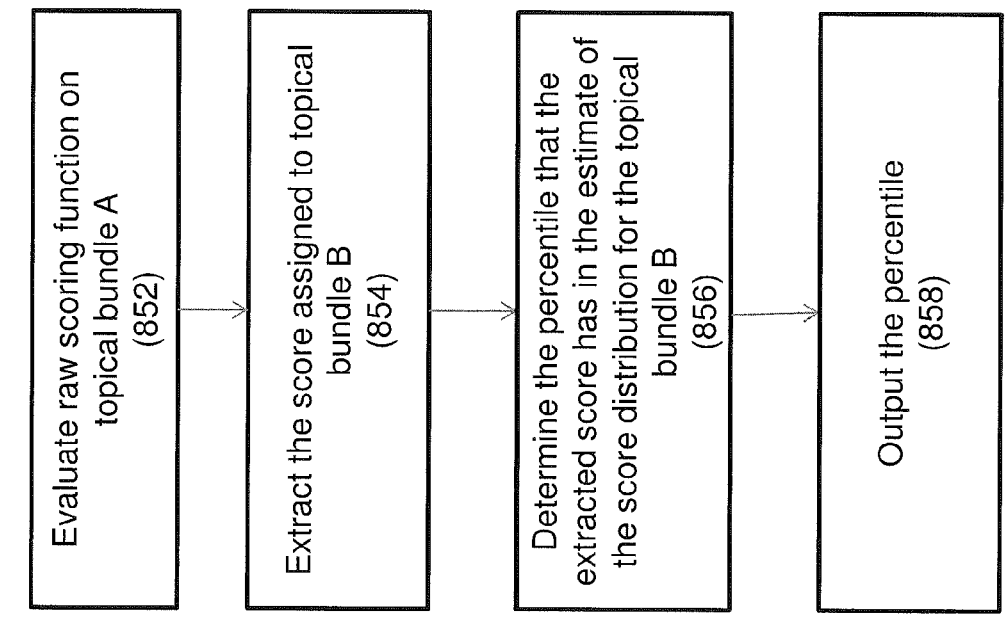
FIG. 8B depicts a flow chart of an exemplary method used to compute a score in accordance with an embodiment.

Once in possession with the estimate in operation 806, the question of what is the relevance of topical bundle A to topical bundle B may be answered by a second task or method 850, as shown in FIG. 8B.

As shown in FIG. 8B, the second task 850 may include a number of operations. In an operation 852, the raw scoring function may be evaluated on the topical bundle A. In an operation 854, a score assigned to the topical bundle B may be extracted from the result of operation 852. In an operation 856, a determination may be made regarding the percentile that the extracted score in operation 854 has in the estimate of the score distribution for the topical bundle B. In an operation 858, the determined percentile of operation 856 may be output.

In some embodiments, the operations 852 and 854 may be fused into a single operation. For example, it might not be necessary to evaluate the entire raw scoring function to produce the score that is desired in operation 854.

In some embodiments, the estimate of the score distributions may be pre-computed. In some embodiments, the raw scoring functions may be pre-computed. Pre-computation may be useful for reducing memory/storage capacity and/or reducing needed processing resources, as well as for obtaining relations between any two topical bundles quickly.

In some embodiments, the raw scoring function may be implemented by obtaining an estimate of a stationary distribution of a Markov Chain that has been designed specifically for the topical bundle on which the raw scoring function will be evaluated, and which describes a Markov Random process that visits nodes in a graph by crossing its links with given probabilities. One such Markov Chain can be designed by starting from a general Markov Chain derived, for example, from an incidence matrix of the graph, and then adding links from every node in the graph back to a node contained in the topical bundle, associating a suitable probability with such a link.

Referring to FIG. 9, a refined score table 900 in accordance with one or more embodiments is shown. The table 900 is similar to the table 700 of FIG. 7. The values associated with the table 900 are different from the values associated with the table 700. For example, in the table 900, the numerical values may range from 0.5 to 1.0. In the table 900, the closer a value is to 1.0 signifies a stronger relationship between a query topic and a personal topic. In the table 900, the closer a value is to 0.5 signifies that a query topic is unrelated to a personal topic. As shown in the table 900, the query topic of "data mining" has a value of 0.7 in relation to the personal topic of "parallel processing", which represents a moderate or mid-level relationship between data mining and parallel processing. As shown in the table 900, the query topic of "USA" has a value of 0.5 in relation to the personal topic of "parallel processing", which indicates that the USA and parallel processing are highly unrelated. Thus, using the techniques described herein, a more accurate relationship between topics may be developed as reflected in the differences between the tables 700 and 900.

Figure 10:
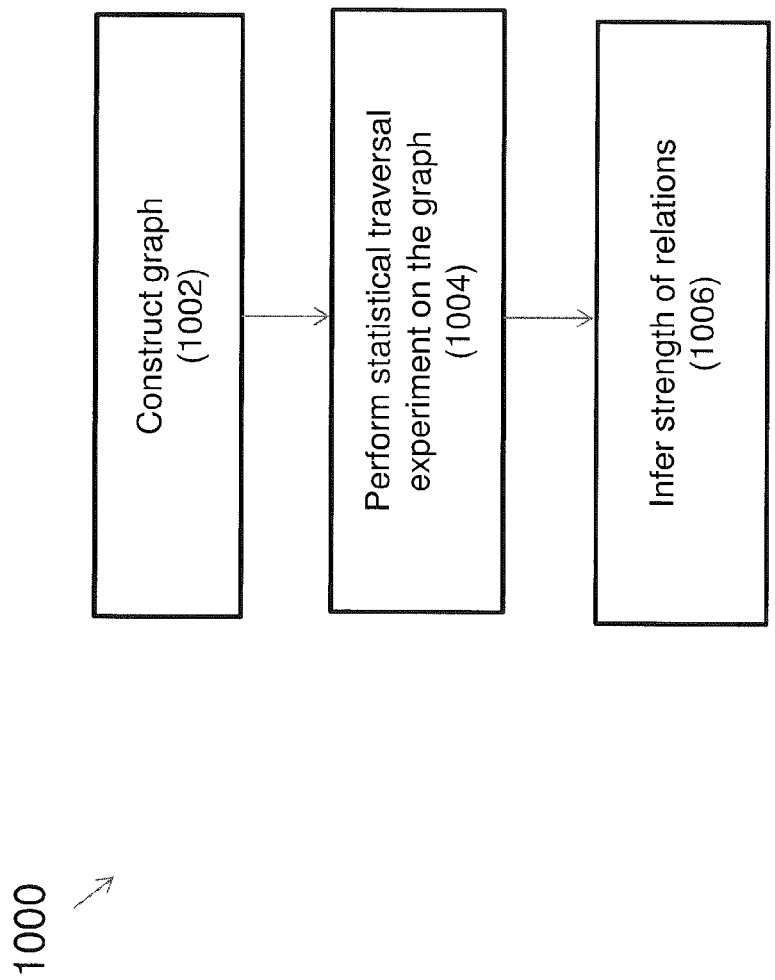
FIG. 10 depicts a flow chart of an exemplary method for inferring relations between topics in accordance with an embodiment.

Referring to FIG. 10, a flow chart of an exemplary method 1000 is shown. The method 1000 may be used to infer relations between topics.

In block 1002, a graph may be constructed. The graph may include at least three nodes. Relations between nodes may be represented by one or more edges.

In block 1004, a statistical traversal experiment may be performed on the graph. The traversal experiment includes traversing at least two edges and may performed using a matrix such as that as described previously with respect to Equation #1.

In block 1006, a strength of relations may be inferred between a first of the three nodes and a second of the three nodes based on the traversal experiments. In an embodiment, the strength of relations may inferred using Equation #2.

Embodiments of the disclosure may be used to adjust a raw score (e.g., 'W' in Equation #2 above) to take into account the interests expressed by a general population or subpopulation. A raw score taken by itself might not have as much meaning or significance without a baseline for comparison. In reference to Equation #2 above, 'Z' may represent a reference or baseline distribution to compare 'W' to.

To take a more concrete example, a first user may express an interest in the topic "USA" with a probability of $10^{-5}$ and an interest in the topic "law school" with a probability of $10^{-7}$. Treating these probabilities as raw scores, one might be inclined to assume that the first user is more interested in the USA than law school, given that $10^{-5}$ is greater than $10^{-7}$. However, if a reference population is interested in the USA with an average probability of $10^{-5}$ and law school with an average probability of $10^{-8}$, then the first user may actually be more interested in law school than the USA, at least relative to the reference population's average interests.

In connection with the above comparison between "USA" and "law school" the first user's interests in those topics/subjects were referenced to an average of those topics as expressed by the reference population. More nuanced comparisons may be made between a first user's raw scores and the reference population. For example, if every single user in the reference population's answers are recorded regarding their interest levels in "USA" and "law school", than parametric models may be developed (potentially based on histograms or histograms) to provide greater levels or degrees of information regarding the first user's interest in "USA" and "law school". For example, one might be able to determine that the first user's interest in law school ranks that first user in, e.g., the top 90% of users interested in law school, but merely in the top 40% in connection with the USA.

Figure 11:
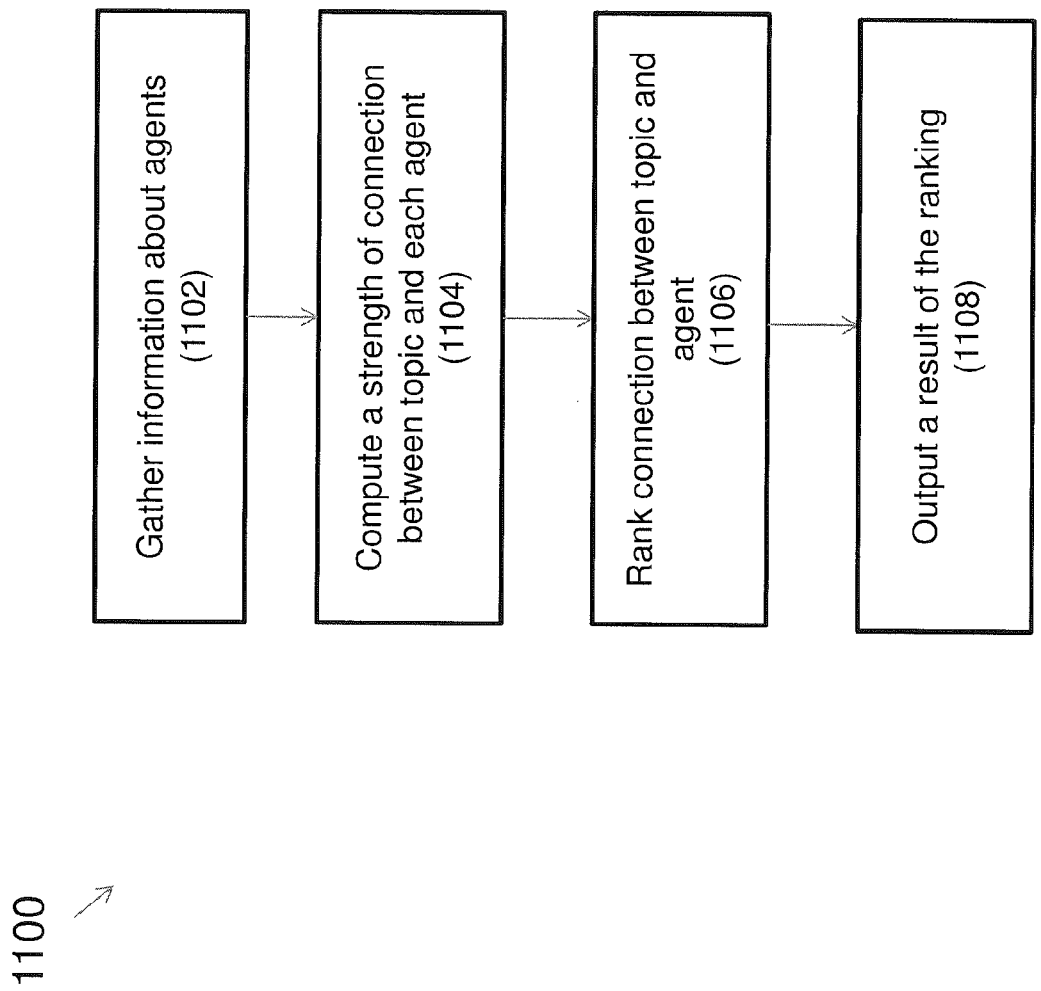
FIG. 11 depicts a flow chart of an exemplary method for inferring relations between topics in accordance with an embodiment.

Referring now to FIG. 11, a flow chart of a method 1100 is shown. The method 1100 may be used to identify an interest of a topic to an agent, the interest being relative to the interest of the topic to other agents.

In block 1102, information may be gathered about a set of agents. The information may include an expression of interest in one or more topics.

In block 1104, based on the information of block 1102, a strength of a connection between the topic and each agent in the set of agents may be computed.

In block 1106, a ranking may occur regarding a connection between a topic and an agent based on how distinct that agent's connection is to the topic relative to other agents.

In block 1108, a result of the ranking may be output. For example, an expression of the agent's interest in the topic may be obtained as part of block 1108. The result of block 1108 may include the agent's interest in additional topics, as well as other agents' interests in one or more topics.

Technical effects and benefits include providing a social interaction facilitation tool that automates the process of identifying commonalities between two or more users or individuals to facilitate serendipitous social interaction regarding a particular topic of interest. The social interaction facilitation tool may gather information about the users from various data sources, such as social media websites, and may establish a community (e.g., an instant community). The community may be established based on a description of content of a message, recipient data corresponding to at least two possible recipients of the message within a population of possible recipients, and a selection of a relevant subpopulation based on a ranking of a strength of at least one indirect relationship between said description and said recipient data, wherein said indirect relationship may be defined by said description, said recipient, and at least one additional data source. The community may provide a two-way communication channel between a sender of the message and the relevant subpopulation.

Technical effects and benefits may also include providing an estimate of the closeness or relatedness of topics or ideas based on graph analytics and/or one or more scoring functions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
    a memory having computer readable computer instructions; and
    a processor for executing the computer readable instructions to perform a method comprising:
    accessing a graph comprised of a plurality of nodes and edges, each node representing a topic, and each edge representing a known association between two topics;
    determining a first probability that, given that an agent has expressed an interest in a single topic represented by a node in the graph, the agent is interested in each of the topics represented by nodes in the graph, the determining comprising:
        performing a statistical traversal experiment on said graph, the performing including using a generalized form of a matrix eigenvector algorithm that includes a Markov chain specialized to the first topic;
        inferring a strength of relations between the agent and each of the topics represented by nodes in the graph, the inferring based on statistics extracted from the statistical traversal experiment; and
        adjusting the inferred strength of relations to account for interests expressed in each of the topics by other agents in a reference population;
    deriving a second probability that, given that the agent has expressed an interest in two or more topics represented by nodes in the graph, the agent is interested in each of the topics represented by nodes in the graph,
    calculating an estimate probability by combining the first probability and the second probability using a log-likelihood ratios, wherein lack of interest expressed by the agent in each of the topics is represented as subtraction using the log-likelihood ratios.

2. The system of claim 1, further comprising constructing the graph.

3. The system of claim 1, wherein the single topic and at least one of the other topics in the graph do not have an edge connecting them.

4. The system of claim 1, wherein the Markov Chain has a stationary probability distribution.

5. The system of claim 1, wherein the graph is a sparse graph.

6. The system of claim 1, wherein the performing a statistical traversal experiment further includes iterating the Markov Chain, wherein the inferring a strength of relations includes normalizing a probability distribution obtained based on said iterating to determine a probability of being interested in one of the other topics given interest in the first topic.

7. The system of claim 1, wherein the determining further comprises:
    iteratively selecting a set of nodes included in the graph;
    evaluating, for each iteration, a raw scoring function on the selected set; and
    updating an estimate of a raw score distribution for each set included in the plurality of sets using results of the evaluation to obtain a distribution of the raw scores.

8. The system of claim 7, wherein the raw scoring function is linear, and wherein each selected set of nodes has a single node.

9. The system of claim 7, wherein the updated estimate of the score distribution is based on an assumption that the distribution adheres to a parametric model.

10. The system of claim 7, wherein the method further comprises:
    comparing a raw score to the distribution of the raw scores;
    determining a percentile of the raw score based on the comparing; and
    outputting the determined percentile.

11. The system of claim 7, wherein a raw score distribution for at least one of the sets included in the plurality of sets is pre-computed.

12. The system of claim 7, wherein the iterative selection of the set of nodes and the evaluation of the raw scoring function on the selected set are performed as a fused operation.

13. A computer program product, comprising:
    a computer readable storage medium having program code embodied therewith, the program code executable by a computer to implement:
    accessing a graph comprised of a plurality of nodes and edges, each node representing a topic, and each edge representing a known association between two topics;
    determining a first probability that, given that an agent has expressed an interest in a single topic represented by a node in the graph, the agent is interested in each of the topics represented by nodes in the graph, the determining comprising:
        performing a statistical traversal experiment on said graph, the performing including using a generalized form of a matrix eigenvector algorithm that includes a Markov chain specialized to the first topic;
        inferring a strength of relations between the agent and each of the topics represented by nodes in the graph, the inferring based on statistics extracted from the statistical traversal experiment; and adjusting the inferred strength of relations to account for interests expressed in each of the topics by other agents in a reference population;

deriving a second probability that, given that the agent has expressed an interest in two or more topics represented by nodes in the graph, the agent is interested in each of the topics represented by nodes in the graph, calculating an estimate probability by combining the first probability and the second probability using a log-likelihood ratios, wherein lack of interest expressed by the agent in each of the topics is represented as subtraction using the log-likelihood ratios.

* * * * *